United States Patent
Ganesh et al.

(10) Patent No.: US 6,490,313 B1
(45) Date of Patent: *Dec. 3, 2002

(54) SYSTEM AND METHOD FOR PN OFFSET INDEX PLANNING IN A DIGITAL CDMA CELLULAR NETWORK

(75) Inventors: Rajamani Ganesh, Bedford, MA (US); Pete Allen Boyer, Somerville, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,254

(22) Filed: Dec. 15, 1999

Related U.S. Application Data (63) Continuation of application No. 08/988,736, filed on Dec. 11, 1999, now Pat. No. 6,058,136.

(51) Int. Cl.[7] .................................................. H04K 1/00
(52) U.S. Cl. ........................ 375/130; 375/140; 375/141; 370/342; 370/441
(58) Field of Search ................................. 375/130, 140, 375/141, 146, 354, 367, 356, 377; 370/208, 320, 329, 335, 342, 441, 515

(56) References Cited

U.S. PATENT DOCUMENTS

| | | | |
|---|---|---|---|
| 5,642,377 A | 6/1997 | Chung et al. | 375/200 |
| 5,644,591 A | 7/1997 | Sutton | 375/200 |
| 5,883,889 A | 3/1999 | Faruque | 370/335 |
| 6,049,564 A * | 4/2000 | Chang | 375/130 |
| 6,272,122 B1 * | 8/2001 | Wee | 370/342 |

FOREIGN PATENT DOCUMENTS

| | | | | |
|---|---|---|---|---|
| JP | 10-341479 | | 12/1998 | H04Q/7/36 |
| JP | 2001-32531 | * | 1/2000 | H04Q/7/22 |
| WO | WO 98/49844 | | 11/1998 | H04Q/7/00 |

OTHER PUBLICATIONS

J. Plehn, *Applied Frequency Assignment*, 1994 44th Vehicular Technology Conf., pp. 853–857.

Sivarajan, K.N.; McEliece, R.J.; and Ketchum, J.E., *Channel Assignment in Cellular Radio*, 39 IEEE Vehicular Technology Conf. May 1989, pp. 846–850.

IS–97, *Recommended Minimum Performance Standards for Base Stations Supporting Dual–Mode Wideband Spread Spectrum Cellular Mobile Stations*, EIA Interim Standard Feb. 26, 1996, whole document.

IS–98, *Recommended Minimum Performance Standards for Dual–Mode Wideband Spread Spectrum Cellular Mobile Stations*, EIA Interim Standard, Apr. 17, 1996, whole document.

Principles of CDMA, http://www.cdg.org/a_ross/Principles.html, p. 1.

Spreading Codes, http://www.cdg.org/a_ross/Spreading.html, p. 1.

(List continued on next page.)

*Primary Examiner*—Stephen Chin
*Assistant Examiner*—Chieh M. Fan
(74) *Attorney, Agent, or Firm*—Leonard Charles Suchyta; James K. Weixel (57) ABSTRACT

A system optimally assigns pseudo-noise (PN) offsets in a cellular network that includes several sectors. The system sets parameters for the cellular network, determines potential interference between each of the sectors and mobile units in the cellular network based on the set parameters, and identifies constraints for each of the sectors based on the determined potential interference. The system then approximates a highest co-offset protection value for successful PN offset assignments based on the determined potential interference and the identified constraints, and selectively adjusts a sector co-offset protection value using the approximated highest co-offset protection value as a starting point to obtain optimum PN offset assignments.

41 Claims, 9 Drawing Sheets

OTHER PUBLICATIONS

Reverse CDMA Channel, *http://www.cdg.org/a_ross/Reverse.html*, p. 1–4.

Forward CDMA Channel, *http://www.cdg.org/a—ross/Forward.html*, p. 1–5.

Introduction to CDMA, *http://www.cdg.org/a_ross/Intro.html*, p. 1–2.

IS–95 CDMA System Issues, *http://www.ericson.se/systems/D–AMPS_1900/19_35_36.html*, p. 1–3.

About Granet, *http://info.gte.com/granet/granet_intro.html*, p. 1.

Mobile Station–Base Station compatibility Standard for Dual–Mode Wideband Spread Spectrum Cellular System TIA/EIA Interim Standard, TIA/EIA/IS–95–A, p. 6–1 through 6–285.

* cited by examiner

SYSTEM AND METHOD FOR PN OFFSET INDEX PLANNING IN A DIGITAL CDMA CELLULAR NETWORK

This is a continuation of application Ser. No. 08/988,736, filed Dec. 11, 1999 now U.S. Pat. No. 6,058,136.

FIELD OF THE INVENTION

The present invention relates generally to cellular or mobile communications systems and more particularly to a method for optimally assigning pseudo-noise (PN) offsets to base stations in a Code Division Multiple Access (CDMA) cellular network based on the IS-95A standard to maximize co-offset and adjacent offset protection and to minimize interference in the network.

BACKGROUND OF THE INVENTION

A CDMA cellular network is a digital spread spectrum communications system. The CDMA network includes several base stations each providing digital service to mobile units located in different geographical regions. Communication between a mobile unit and a base station in an IS-95A-based CDMA network occurs on reverse and forward CDMA channels. The reverse CDMA channel is a mobile unit-to-base station direction of communication that carries traffic and signaling information. The forward CDMA channel is a base station-to-mobile unit direction of communication that carries pilot, sync, and paging signals in addition to traffic signals.

The reverse CDMA channel includes access channels and reverse traffic channels. The access channels are used by the mobile unit to initiate communication with a base station, and to respond to paging channel requests.

The forward CDMA channel consists of a pilot channel, a sync channel, up to seven paging channels, and up to sixty-three forward traffic channels. Each of these channels is orthogonally spread by an appropriate Walsh function and then spread by the quadrature pair of PN sequences (I and Q) at a fixed rate of 1.2288 million chips per second.

The base station of a sector continuously transmits on the pilot channel of each active forward CDMA channel. A mobile unit operating within the coverage area of the base station uses this continuous transmission for synchronization. The network assigns each base station of the cell site a specific time (or phase) offset of the pilot PN sequence to identify a forward CDMA channel. A given base station uses the same pilot PN sequence offset, or simply PN offset, on all CDMA frequency assignments. For example, all traffic, sync, and paging channels transmitted from a single base station share the same PN offset. An offset index (0 through 511 inclusive) identifies distinct pilot channels. This offset index specifies the offset value from the zero offset pilot PN sequence. Each offset index increment represents the interval between pilot channels in increments of 64 chips (i.e., 52.08 ms).

An active mobile unit maintains four sets of pilot channels when communicating with a base station of a CDMA sector: the Active Set, the Candidate Set, the Neighbor Set, and the Remaining Set. The Active Set consists of all the pilot channels that the mobile unit is currently using for demodulation. The Candidate Set contains all of the pilot channels that are not currently in the Active Set but have sufficient signal strength to be considered for soft or softer handoff. The Neighbor Set contains pilot channels that are not currently in the Active or Candidate Set, but may become eligible for handoff (e.g., pilot channels of nearby sites). The Remaining Set is the set of all possible assigned pilot channels in the CDMA network on the same carrier frequency, excluding the pilot channels defined in the other three sets.

Since all PN offsets in a network are time shifted versions of each other, it follows that with appropriate time delay, an incorrect pilot channel from any sector may be mistaken for a pilot channel in the Active Set. However, a large time delay between a mobile unit and a base station implies a large path loss and hence a weak pilot channel signal at the mobile unit Thus, if the PN offsets of different sectors have a large separation between them, a pilot channel signal would have a very high path loss and hence a very trivial probability of appearing within an active search window of another pilot channel. This makes an appropriate assignment of PN offsets crucial to ensure that a wrong pilot channel would be sufficiently weak so as not to cause any problems.

Reusing PN offsets is possible if: (1) a mobile unit being served by a base station is not interfered with by the pilot channel of another CDMA base station using the same PN offset, or (2) a base station in the network can uniquely identify all the pilot channel signals being reported by a mobile unit that it is serving.

The mobile unit uses a network-selected PILOT_INC parameter for the base station to determine which pilot channels to scan from among the Remaining Set, which is the set of all possible pilot channels in the system that are integer multiples of the PILOT_INC parameter on the current CDMA frequency assignment, excluding pilot channels in the other sets. A Remaining Set pilot channel is assigned a lower priority in the scanning order, than an Active, Candidate or a Neighbor Set pilot channel.

The setting of the PILOT_INC parameter by the network is crucial to PN offset index planning. It has an impact on the mobile unit's Remaining Set pilot channel scanning rate, the amount of co-offset and adjacent offset protection available in the network, and the total number of offsets available. The PILOT_INC parameter is an integer having a valid range from 1 to 15. Low values of PILOT_INC provide good co-offset protection, more offsets from which to choose, and less reuse of offsets, and increase the time to scan the pilot channels in the Remaining Set of the mobile unit High values of PILOT_INC, on the other hand, provide good adjacent-offset protection, fewer offsets from which to choose, and more reuse of offsets, and decrease the time to scan the pilot channels in the Remaining Set of the mobile unit Conventional PN offset planning methods are based on idealized hexagonal grid structures, and accomplished by fitting a highly irregular pattern of cellular base station locations to a tessellated hexagonal grid pattern. PN offsets are assigned by reusing the same PN offset a specified predetermined number of base stations away.

In order to plan for growth, these methods usually group PN offsets into a few groups, typically three for tri-sectored sites in the network. One sector of a base station is assigned a PN offset from one of the three groups. The other two sectors of the base station are assigned PN offsets from the other two groups, respectively. A few PN offsets in each group are reserved for growth of the network when new base stations are added. The remaining PN offsets in each group are used to make assignments. Such assignments by groups are not optimal in terms of reducing inter-sector interference. Moreover, the unused PN offsets constitute a wasted resource until the network grows.

Such methods make initial assignment choices very easy because the assignments can be made without computer assistance or optimized planning. After an initial assignment, irregularities are accounted for by manual modification of the assignment by an experienced engineer with local knowledge of the environment Unfortunately, PN offset planning under these idealized assumptions creates many inefficiencies due to the initial assignment's inaccurate reflection of reality.

The irregularities that produce these inefficiencies are due to several factors. First, the need for base stations in a particular area is highly non-uniform because people do not tend to distribute themselves uniformly over large areas. They tend, for example, to cluster in neighborhoods, at work, and in cities. Second, choices for new base station locations are very limited due to factors such as zoning. Base station locations cannot be chosen in ideal locations even if the user traffic was uniformly distributed over a geographic area Lastly, areas that are covered by base stations are highly dependent upon the propagation environment Irregularities such as terrain, morphology, and reflecting structures produce highly irregular areas of coverage.

Automatic PN offset planning has heretofore found only limited application due to the need to account for several sets of constraints in a timely manner. Optimization systems must be able to handle large cellular networks with constraints on both co-offset and adjacent offset assignments. For example, the same PN offset cannot be used by neighbors of a base station or neighbors of neighbors of a base station. Adjacent offset protection must be provided to ensure that an adjacent offset does not propagate into a coverage area with significant power to interfere with the pilot channel. Both allowable PN offset separation and interference limits are constraints needed to address this problem adequately.

Many conventional systems handle optimization problems under minimum allowable PN offset separation constraints only. These systems are overly constraining since a range of PN offset prohibitions is needed between base station sectors rather than simply prohibiting use of every offset below a certain threshold interference. These systems also ignore factors such as interference from more than two assignments of the same offset.

By constraining the problem with minimum allowed offset separation between sectors, these systems tend to over constrain the PN offset assignment problem. For PN offset planning, two sectors interfere if the pilot channels arriving at the mobile unit are in phase with each other to within the search window of the mobile unit The systems look at all possible mobile unit locations to find a range of invalid PN offset separations that they use to constrain the problem. The constraint on PN offset separation, however, results in a range of allowable PN offsets rather than a minimum allowed PN offset separation.

Other systems handle interference as well as separation constraints. These systems are designed, however, for the different problem of making analog frequency assignments. Such problems tend to be large and arise from the need to plan for many assignments per analog frequency. These systems must use less complex methods than those that can be used for PN offset planning.

None of the conventional systems provide optimum PN offset assignment because none of these systems considers all possible interference mechanisms in the network, constraints on co-offset and adjacent offset protection, CDMA border and beacon sites, and preassigned PN offsets. Therefore, a need exists to provide optimum PN offset assignments in CDMA cellular networks.

SUMMARY OF THE INVENTION

Systems and methods consistent with the principles of the present invention address this need for optimum PN offset assignment by minimizing interference between CDMA pilot channels and enabling scalability for future growth without the need for a revised network-wide retune.

In accordance with the purpose of the invention as embodied and broadly described herein, the system consistent with the principles of the present invention optimally assigns PN offsets in a cellular network that includes several sectors. The system sets parameters for the cellular network, determines potential interference between each of the sectors and mobile units in the cellular network based on the set parameters, and identifies constraints for each of the sectors based on the determined potential interference. The system then approximates a highest co-offset protection value for successful PN offset assignments based on the determined potential interference and the identified constraints, and selectively adjusts a sector co-offset protection value using the approximated highest co-offset protection value as a starting point to obtain optimum PN offset assignments.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The description includes exemplary embodiments, other embodiments are possible, and changes may be made to the embodiments described without departing from the spirit and scope of the invention. The following detailed description does not limit the invention. Instead, the scope of the invention is defined by the appended claims.

Figure 1:
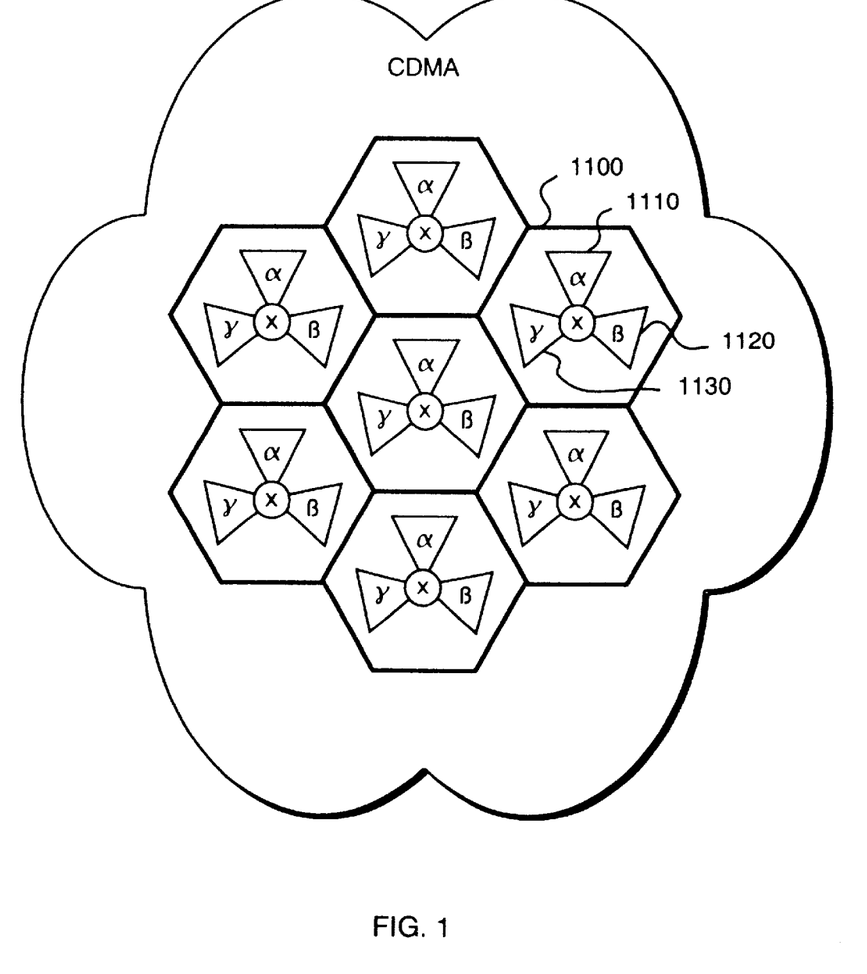
FIG. 1 is a block diagram of a digital CDMA cellular network consistent with the principles of the present invention.

FIG. 1 is a block diagram of a digital CDMA cellular network consistent with the principles of the present invention. The CDMA network includes numerous cell sites, such as cell site 1100. The cell sites may be tri-sectored cell sites containing three sectors $\alpha$, $\beta$, and $\gamma$. Cell site 1100, for example, includes sector $\alpha$ 1110, sector $\beta$ 1120, and sector $\gamma$ 1130, each containing a base station. The CDMA network assigns each base station a specific time, or phase, offset of the pilot PN sequence to identify a forward CDMA channel. The same pilot PN sequence offset is used on all CDMA frequency assignments for a given sector.

Distinct pilot channels are identified by an offset index (0 through 511 inclusive) that specifies the offset value from the zero offset pilot PN sequence. Since the CDMA network allows mobile units in adjacent cell sites to use the same frequency, inter-sector interference isolation is obtained by limiting the "valid" set of offsets to multiples of the PILOT_INC parameter. The setting of the PILOT_INC parameter (valid values range from 1 to 15) by the network has an impact on the mobile unit's pilot scanning rate, the amount of co-offset and adjacent offset protection available in the network, and the total number of offsets available.

Systems and methods consistent with the principles of the present invention provide optimum PN offset index planning in the digital CDMA cellular network while minimizing interference between CDMA pilot channels and enabling scalability for future growth sites without the need for a network-wide retune. The PN offset index planning systems and methods consistent with the principles of the present invention are based on the EIA/TIA/IS-95A standard, which is hereby incorporated by reference.

Figure 2:
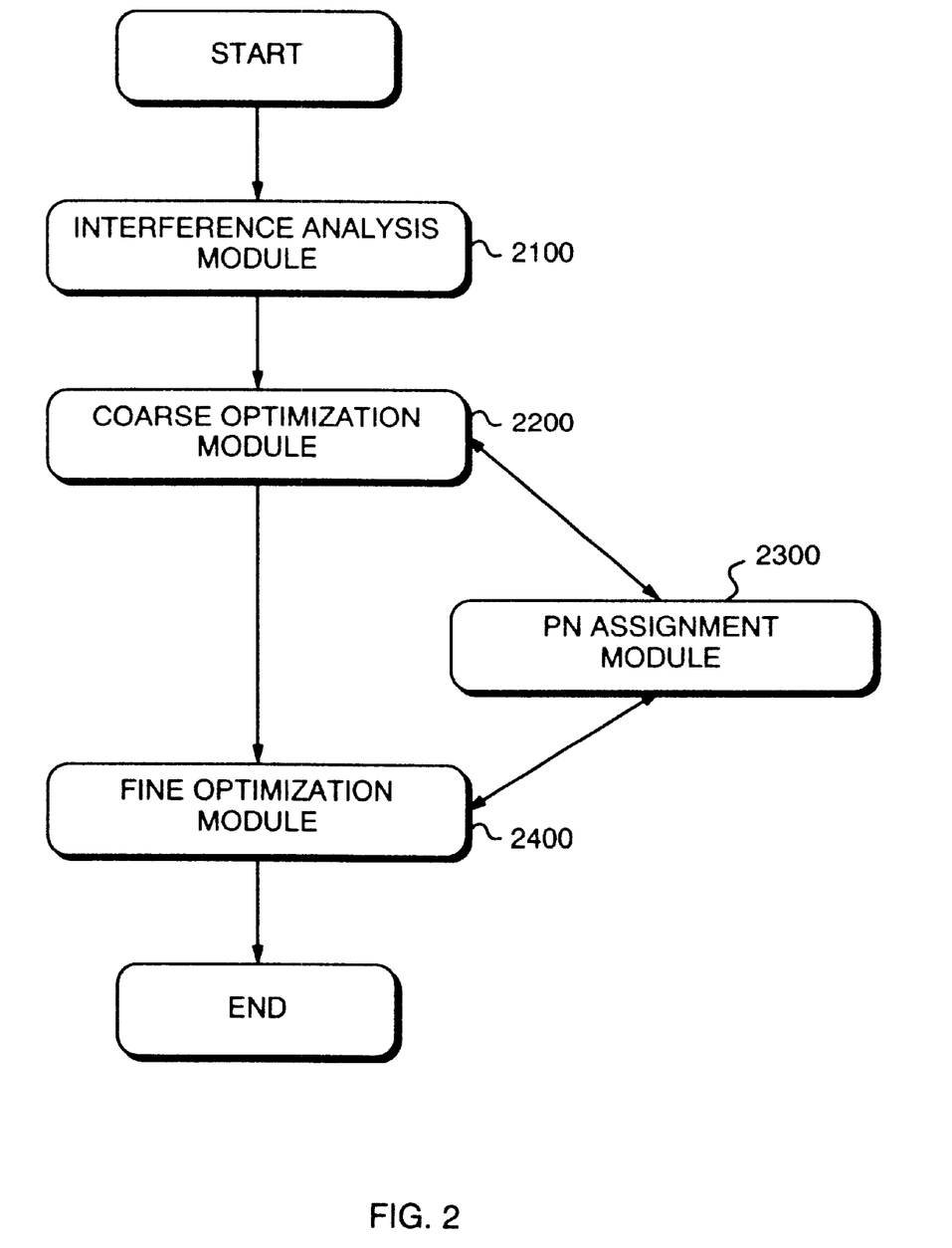
FIG. 2 is a flow chart of a CDMA PN offset index planning method consistent with the principles of the present invention.

FIG. 2 is a flow chart of a CDMA PN offset index planning method consistent with the principles of the present invention. The method is executed by a computer, such as a personal computer or a larger main frame computer, that includes a processor and a memory. The computer operates on a simulated CDMA network to provide the optimum PN offset index planning for use in a real CDMA network.

The method consists of four modules: interference analysis module 2100, coarse optimization module 2200, PN assignment module 2300, and fine optimization module 2400.

Interference analysis module 2100 gathers information from the CDMA network, computes the interference possible between every base station and every mobile unit in the network, and identifies all sets of constraints for each sector. The values of the interference and the constraints set by interference analysis module 2100 are then used by the other modules. Coarse optimization module 2200 approximates a highest co-offset protection value for which successful PN offset assignments can be made. PN assignment module 2300 attempts to find an assignment of PN offsets from a pool of candidate PN offsets available to the base stations. Fine optimization module 2400 selectively adjusts the co-offset protection value for a successful PN offset assignment using the results of coarse optimization module 2200 as a starting point.

Figure 3:
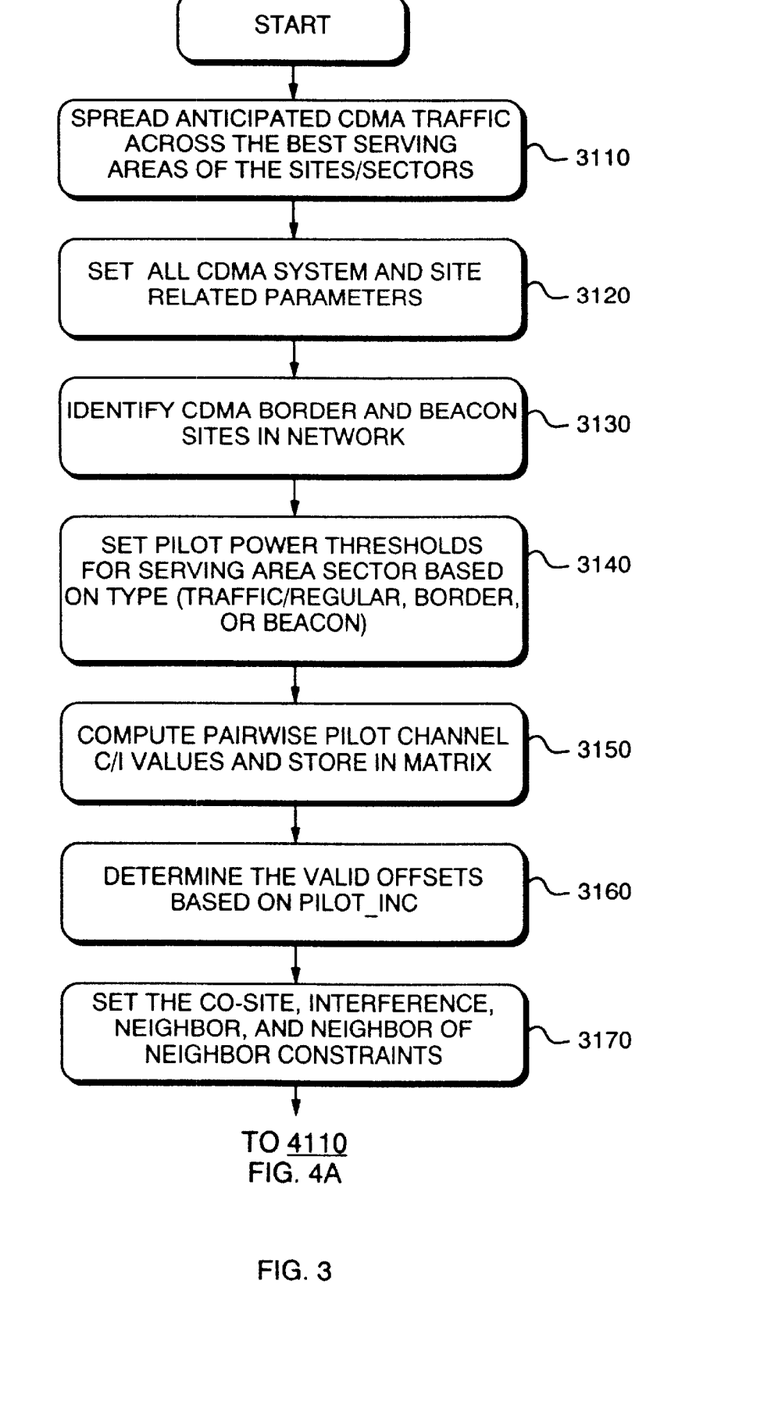
FIG. 3 is a flow chart of the interference analysis module of FIG. 2.

FIG. 3 is a flow chart of interference analysis module 2100. The module begins by spreading CDMA traffic, setting CDMA parameters, and identifying CDMA border and beacon sites in the network [steps 3110–3130]. Spreading the CDMA traffic entails designating a traffic map for the network so as to distribute the anticipated CDMA network traffic across the best serving areas of all of the cell sites/sectors. The CDMA parameters include power settings for all of the channels, antenna gain, cable loss, handoff thresholds, etc. The CDMA border and beacon sites are identified to ensure accurate calculation of interference from the CDMA border and beacon sites located in the CDMA to Advanced Mobile Phone System (AMPS) border areas. Threshold pilot power for the serving area of these sites is kept higher than the pilot power for the regular CDMA sites because of the hard handdown required from CDMA to AMPS before the mobile unit loses synchronization with any forward CDMA channel [step 3140].

The border and beacon sites are selected a priori in the radio network, prior to computation of a pilot channel interference (C/I) matrix [step 3150]. The pilot channel C/I matrix holds the "pairwise C/I" values for every pair of CDMA sectors in the network. The pairwise C/I values represent a measure of the strength of the carrier power relative to the interfering power from one interfering sector caused to 90% of the mobile units in a carrier sector on the assumption that the two sectors share the same PN offset index. C represents the carrier sector pilot channel power, and I represents interference power from the interfering sector using the same PN offset index.

Interference power is calculated based on parameters such as pilot channel nominal power, forward cable loss, and antenna gain at each CDMA sector. Several other factors such as the link direction, coverage areas, and traffic distributions are also taken into account. In addition, only those mobile units where the received pilot channel power from the carrier sector exceeds a certain threshold pilot power are considered in the analysis. The threshold pilot power could be different from the serving area of one CDMA sector to another and is dependent on the parameters mentioned above.

Next, the module determines valid offsets based on the PILOT_INC parameter [step 3160]. As previously mentioned, inter-sector interference isolation in the CDMA network is obtained by limiting the "valid" set of offsets to multiples of the PILOT_INC parameter. These valid offsets are used in conjunction with the pilot channel C/I matrix values to set up various constraints for each sector [step 3170]. The constraints decide the minimum offset index separation required between any pair of CDMA sectors in the network. Various constraints are taken into account between each pair of sectors, and before any PN offset assignment occurs a final constraint value between a pair of sectors is calculated from the maximum value of all the constraints. The final constraint value ranges from the value of PILOT_INC to four times the value of PILOT_INC. The different constraints determined for each pair of CDMA sectors in the network include: co-site constraints, interference constraints, neighbor constraints, and neighbor of neighbor constraints.

The co-site constraints regulate the offset separation between sectors of the same cell site. The co-site constraints are set based on the user-input PILOT_INC parameter and vary from 2 to 4 (i.e., 2 to 4 times the PILOT_INC parameter, where 4 is used for low values of the PILOT_INC parameter). The interference constraints are set based on the selected co-offset protection and the pilot channel C/I values within coarse and fine optimization modules 2200 and 2400, respectively. The interference constraints are set to one offset separation (or one PILOT_INC separation) if the C/I values for any pair of CDMA sectors is less than the selected co-offset protection constrain.

The neighbor constraints dictate the offset separation between two neighboring sectors. The neighbor constraints are set to a value ranging from 1 to 4 (i.e., 1 to 4 times the PILOT_INC parameter) based on whether the neighboring sectors are bound by co-site or interference constraints. The neighbor constraints are also set between all pairs of sectors in two CDMA cell sites, if any sector of one CDMA cell site is a neighbor of any sector of another CDMA cell site. For example, if the a sector of a CDMA cell site ($\alpha_1$) is the neighbor of the β sector of another CDMA cell site ($\beta_2$), then the neighbor constraints are set to one not only between $\alpha_1$ and $\beta_2$ but also between $\alpha_1$ and $\alpha_2$ and between $\alpha_1$ and $\gamma_2$, and vice versa (where $\alpha_1$, $\beta_1$, and $\gamma_1$ are the three sectors of the tri-sectored CDMA cell site 1).

The neighbor of neighbor constraints regulate the offset separation between sectors α and γ, given that sectors α, β and sectors β, γ are neighbors. The neighbor of neighbor constraints are set based on the pairwise pilot channel C/I values between sectors α and β and between sector β and γ, and all of the other constraints. An interference threshold which is lower than the CDMA handoff threshold is used and compared to the pairwise pilot channel C/I values to set the neighbor of neighbor constraints equal to one PILOT_INC separation.

Figure 4A:
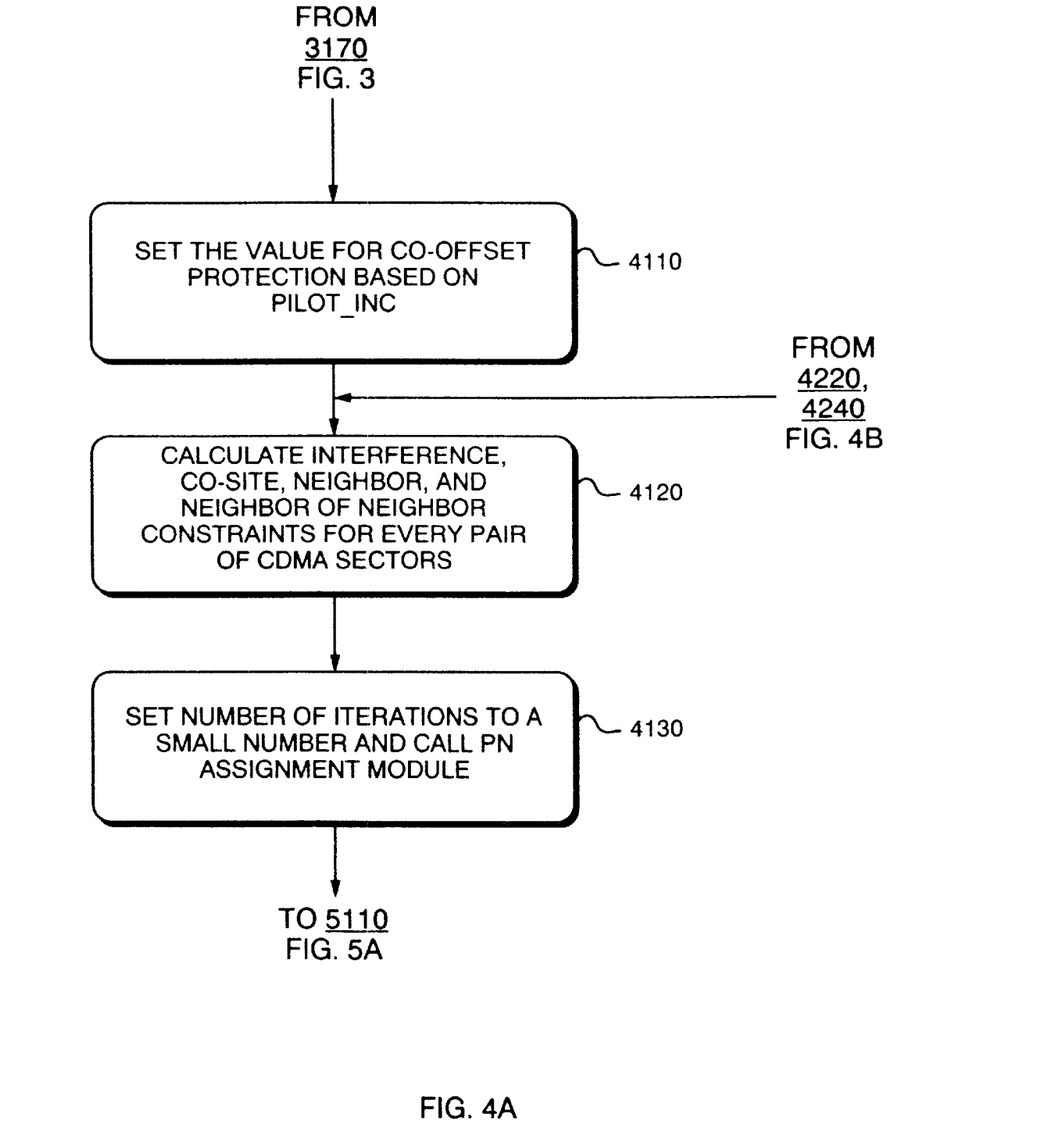
FIGS. 4A and 4B are flow charts of the coarse optimization module of FIG. 2.
Figure 4B:
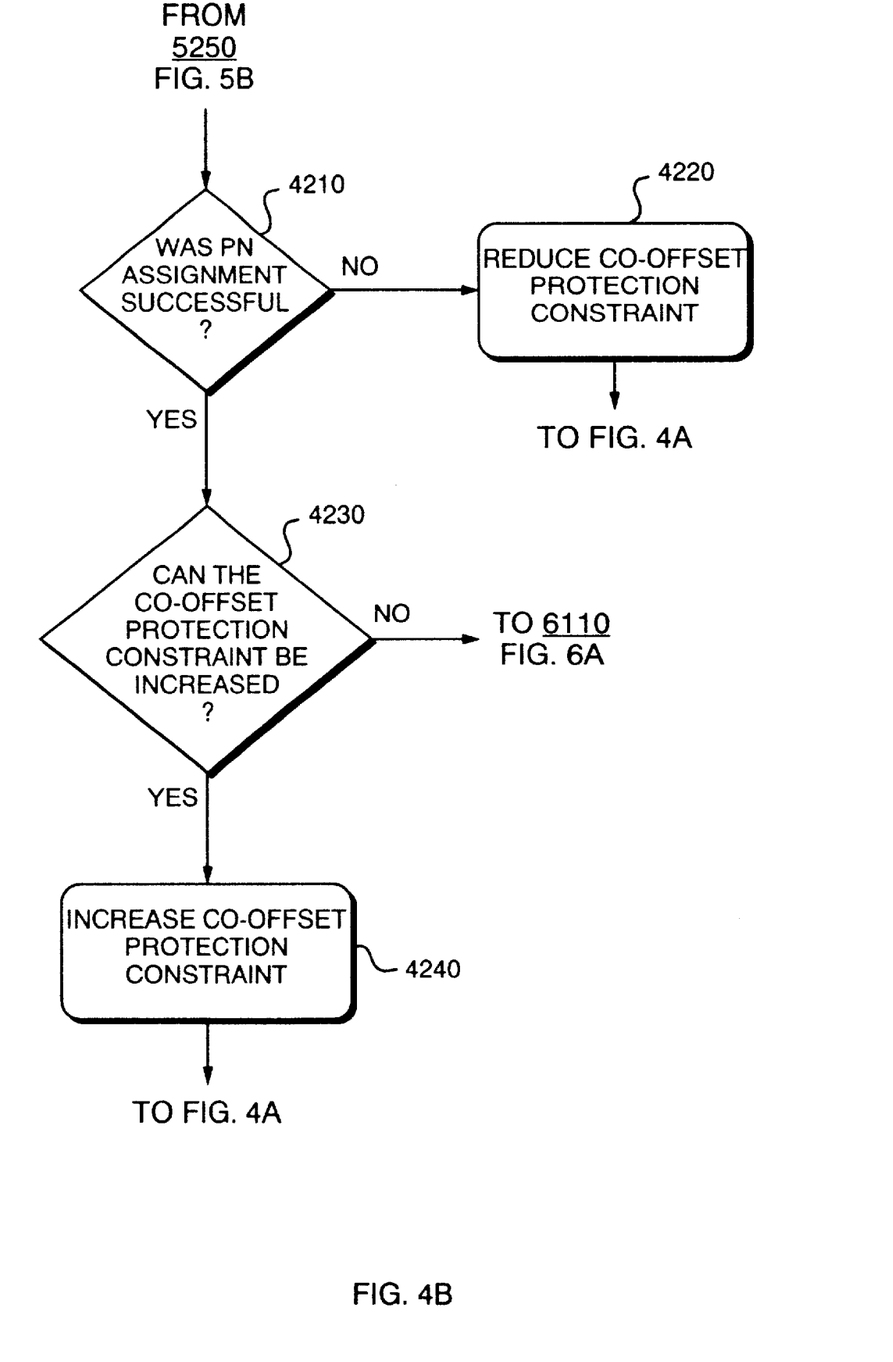

Once interference computation module 2100 completes, coarse optimization module 2200 begins. FIGS. 4A and 4B are flow charts of coarse optimization module 2200. Coarse optimization module 2200 approximates a highest co-offset protection value for which successful PN offset assignments can be made.

The module begins by setting a starting value for co-offset protection based on the PILOT-INC parameter [step 4110]. Using the co-offset protection starting value, the module determines the interference, co-site, and neighbor constraints for all the CDMA sectors in the network [step 4120]. The module uses the co-site constraints along with the interference constraints to set the neighbor of neighbor constraints by comparing pairwise C/I values between neighboring sectors with the co-offset protection value. The module next sets the number of iterations for attempting to find a PN offset assignment to a small number and calls PN assignment module 2300 [step 4130].

Figure 5A:
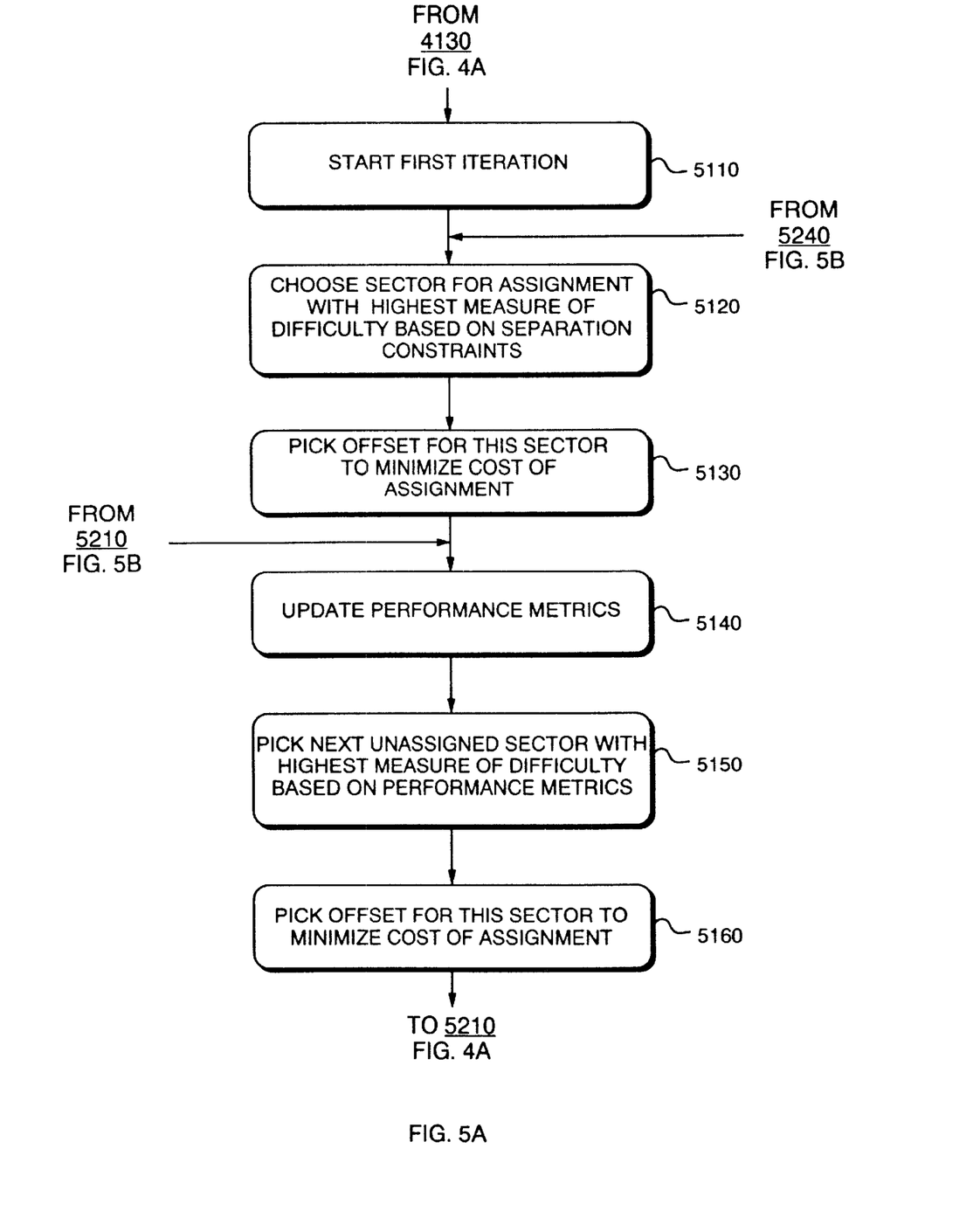
FIGS. 5A and 5B are flow charts of the PN assignment module of FIG. 2.
Figure 5B:
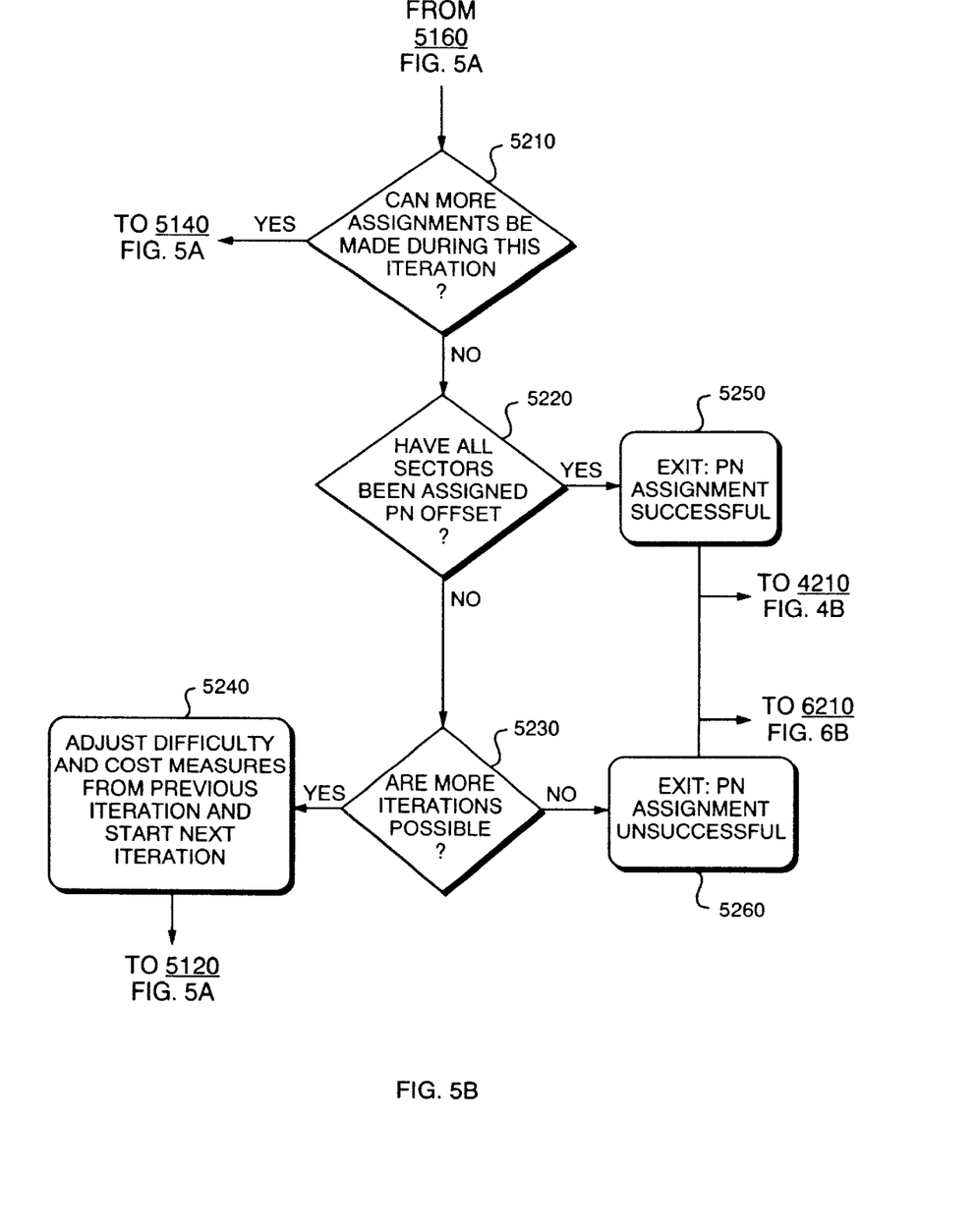

FIGS. 5A and 5B are flow charts of PN assignment module 2300. PN assignment module 2300 attempts to find an assignment of PN offsets from a pool of candidate PN offsets available to the sectors. The pool of candidate PN offsets (0 through 511) is limited to multiples of the PILOT_INC parameter to obtain sufficient inter-sector interference isolation. The module makes an assignment so as to meet all of the constraints on both offset separation and pilot channel interference.

PN assignment module 2300 begins a first iteration of the number of iterations set by coarse optimization module 2200 [step 5110]. The module chooses a sector for assignment with a highest measure of assignment difficulty based on the separation constraints [step 5120]. PN offset separation constraints are specified in terms of an allowed offset separation for all pairs of CDMA sectors under consideration. The allowed offset separation for any pair of CDMA sectors is derived from the various constraints described earlier.

The adjacent offset separation constraints are controlled by the PILOT_INC parameter. A large value of PILOT_INC ensures a greater adjacent separation between PN offset assignments at the cost of reducing the available pool of offsets passed to PN assignment module 2300. The effect of reducing the pool is to increase the number of times the same PN offsets from the pool are reused across the network creating potential interference.

This interference is accounted for through the specified co-offset protection constraint The pairwise pilot channel C/I values are used to estimate the $C/I_{sum}$, where C is the "carrier" pilot channel power and $I_{sum}$ is the sum of all interference powers from all sectors which use the same PN offset The value of $C/I_{sum}$ is computed incrementally and compared to the specified co-offset protection threshold before making each PN offset assignment. If a candidate PN offset falls below the threshold, it is not considered as a viable candidate for an assignment. Also if a candidate offset does not meet the offset separation requirements, it is discarded as a candidate for an assignment. From the remaining set of candidate PN offsets, the module chooses an offset to minimize a measure of assignment difficulty across the entire network [step 5130].

The module then updates the performance metrics [step 5140]. The performance metrics include the measure of assignment difficulty and $C/I_{sum}$ values. The performance metrics are updated after every assignment choice.

Once the performance metrics have been updated, a next sector is chosen with a highest measure of assignment difficulty based on the performance metrics [step 5150]. The module chooses an offset to minimize the measure of assignment difficulty across the entire network [step 5160].

The module then determines whether more assignments can be made during this iteration [step 5210] (FIG. 5B). If more assignments can be made, the module updates the performance metrics [step 5140], chooses a next unassigned sector [step 5150], and selects an offset for the chosen sector (step [5160]. If no more assignments can be made, the module determines whether all sectors have been assigned PN offsets (step [5220]. If unassigned sectors remain, the module determines whether any iterations remain [step 5230]. Each assignment attempt constitutes an iteration. If more iterations are possible based on the number of iterations set by coarse optimization module 2200, the module adjusts the difficulty and cost measurements to reflect knowledge acquired during the previous iterations, and starts the next iteration [step 5240].

If all of the sectors have been assigned PN offsets, the module declares the PN offset assignment successful [step 5250]. The module does not attempt to improve upon the assignment. Whereas, if all of the sectors have not been assigned PN offsets and no more iterations remain, the module declares the PN offset assignment unsuccessful [step 52501]. In either instance, the module returns the assignment information to coarse optimization module 2200.

Turning to FIG. 4B, coarse optimization module 2200 determines whether the PN offset assignment was successful [step 4210]. If the PN offset assignment was unsuccessful, the module reduces the co-offset protection constraint [step 4220] and returns to step 4120, where it uses the co-offset protection constraint to set the interference, co-site, and neighbor constraints.

If the PN offset assignment was successful, however, the module determines whether the co-offset protection constraint can be increased [step 4230]. If the co-offset protection constraint can be increased, the module increases the co-offset protection constraint [step 4240] and returns to step 4120, where it uses the co-offset protection constraint to set the interference, co-site, and neighbor constraints.

Figure 6A:
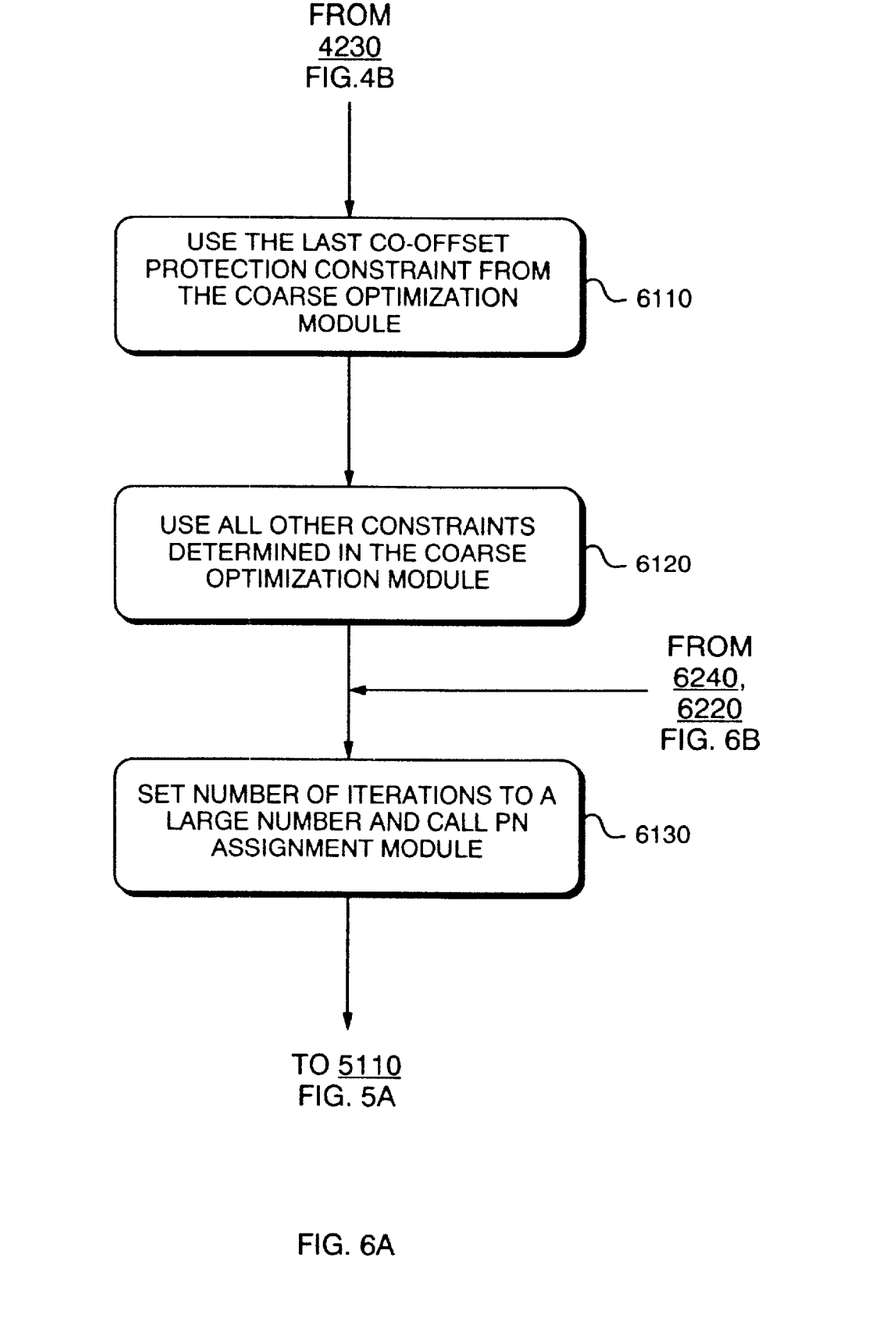
FIGS. 6A and 6B are flow charts of the fine optimization module of FIG. 2.
Figure 6B:
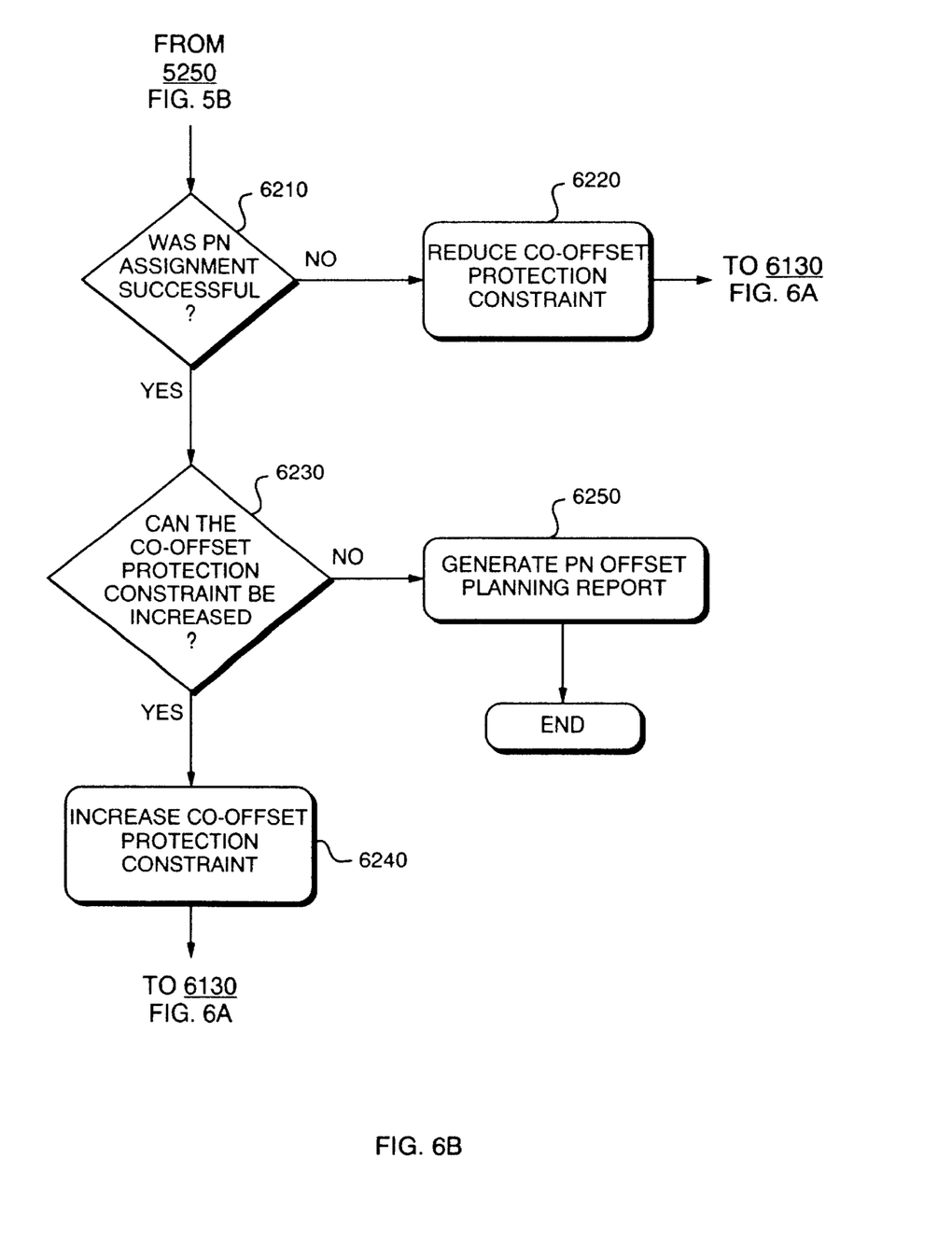

If, on the other hand, the module determines that the co-offset protection constraint cannot be increased, the module calls fine optimization module 2400. FIGS. 6A and 6B are flow charts of fine optimization module 2400. Fine optimization module 2400 selectively adjusts the co-offset protection constraint to obtain a successful PN offset assignment. The module uses the last setting for the co-offset protection constraint and all of the offset spacing constraints (e.g., interference, co-site, neighbor, and neighbor of neighbor) from coarse optimization module 2200 as a starting point [steps 6110 and 6120]. The module sets the number of iterations for attempting to find a PN offset assignment to a large number and calls PN assignment module 2300 [step 6130].

Returning to FIGS. 5A and 5B, PN assignment module 2300 begins a first iteration of the number of iterations set by fine optimization module 2400 [step 5110]. The module chooses a sector for assignment having a highest assignment difficulty based on the separation constraints [step 5120], and selects an offset to minimize a measure of assignment difficulty across the entire network in the manner described above [step 5130].

The module then updates the performance metrics [step 5140], and selects a next sector having a highest assignment difficulty based on the performance metrics [step 5150]. The module chooses an offset to minimize the measure of assignment difficulty across the entire network [step 5160].

The module then determines whether more assignments can be made during this iteration [step 5210] (FIG. 5B). If more assignments can be made, the module updates the performance metrics [step 5140], chooses a next unassigned sector [step 5150], and selects an offset for the chosen sector [step 5160]. If no more assignments can be made, the module determines whether all sectors have been assigned PN offsets [step 5220]. If unassigned sectors remain, the module determines whether any iterations remain based on the number of iterations set by fine optimization module 2400 [step 5230]. If more iterations are possible, the module adjusts the difficulty and cost measurements to reflect knowledge acquired during the previous iterations, and starts the next iteration [step 5240].

If all of the sectors have been assigned PN offsets, the module declares the PN offset assignment successful [step 5250]. Whereas, if all of the sectors have not been assigned PN offsets and no more iterations remain, the module declares the PN offset assignment unsuccessful [step 5250]. In either instance, the module returns the assignment information to fine optimization module 2400.

Turning to FIG. 6B, fine optimization module 2400 determines whether the PN offset assignment was successful [step 6210]. If the PN offset assignment was unsuccessful, the module reduces the co-offset protection constraint [step 6220] and returns to step 6130, where it sets the number of iterations to a large number and calls PN assignment module 2300.

If the PN offset assignment was successful, however, the module determines whether the co-offset protection constraint can be increased [step 6230]. If the co-offset protection constraint can be increased, the module increases the co-offset protection constraint [step 6240] and returns to step 6130, where it sets the number of iterations to a large number and calls PN assignment module 2300.

If, on the other hand, the co-offset protection constraint cannot be increased, the module declares the PN offset assignment optimum, and generates a PN offset planning report [step 6250]. The module declares this PN offset assignment optimum because it maximizes the co-offset and adjacent offset protection for all of the CDMA sectors in the network The adjacent offset protection is dependent upon the value of the PILOT_INC parameter and the maximum constraint used for offset separation between a pair of CDMA sectors. Each increment in the PILOT_INC parameter represents an interval between pilot channels in increments of 64 chips (i.e., 52.08 ms). If the search window size associated with the Remaining Set pilot channels of a mobile unit is ±S chips, then an offset will have to traverse a distance of N*PILOT_INC*64−S chips to fall into the search window of the adjacent PN offset, where N ($1 \leq N \leq 4$) is the maximum offset separation constraint between the serving and the interfering site. For example, if N=1, PILOT_INC=8, and S=±30 chips, then the amount of adjacent offset protection available corresponds to 8*64−30=482 chips= 391.625 $\mu$s~117 km or 73 miles. In other words, a CDMA pilot channel would have to travel approximately 73 miles before causing interference by falling in the active search window of a mobile unit synchronized to a pilot channel using the adjacent PN offset Under normal conditions, the "wrong" CDMA pilot channel would be very weak to cause any problems.

As an example of the benefits provided by the PN planning method consistent with the principles of the present invention, in an experiment conducted in the Houston area, a radio plan with 297 CDMA sectors, PN planning based on sets and idealized assumptions (hexagonal grid) yielded a worst co-offset protection of 17 dB. Utilizing the PN planning method consistent with the principles of the present invention yielded a worst co-offset protection of 27 dB, reflecting a 10 dB decrease in pilot interference.

The following advantages are realized by the systems and methods consistent with the principles of the present invention:

1) The order in which calculation is performed optimizes the assignment and reduces processing time. The coarse optimization module uses a fewer number of iterations to choose the approximate co-offset constraint value for a sub-optimal PN offset assignment based on the PILOT_INC parameter. The fine optimization module fine tunes the last co-offset constraint used in coarse optimization which resulted in a successful assignment, and uses a higher number of iterations to maximize the co-offset protection. As a result, the coarse and fine optimization modules maximize the amount of co-offset and adjacent offset protection possible in the network 2) PN offset planning is performed using individual PN offsets rather than sets of PN offsets. This permits the growth of the network to be engineered when needed rather than in advance, and removes the inefficiency of using an idealized hexagonal lattice. Removing these inefficiencies makes the lowest possible interference and the highest offset protection possible.

3) All interference mechanisms are addressed. The interference from every CDMA pilot channel to each and every possible mobile unit location in the network is considered during the computation of the pilot channel C/I matrix. Situations including high elevation base station pilot channels which may cause interference to other co-site pilot channels though located far away are considered. Conventional planning using sets of PN offsets will not take care of this problem 4) CDMA to AMPS border areas are included in the analysis. The PN offset planning systems and methods consistent with the principles of the present invention make allowances for the CDMA border and beacon sites, which are located in the CDMA to AMPS border areas where a CDMA mobile unit may have to be handed down to an AMPS sector. The thresholds for the border and beacon sites are set appropriately to ensure accuracy of interference from these sites to any CDMA mobile unit in the network.

5) All constraints are considered and automatically set to ensure optimum planning. Neighbor of neighbor, co-site, and adjacent offset constraints are automatically set and adjusted in the coarse and fine optimization modules to ensure optimum PN offset planning based on the user-selected PILOT_INC parameter. There is no need for any manual settings.

6) The ability to change PILOT_INC is included. The PN offset planning systems and methods consistent with the principles of the present invention allow the user to change the PILOT_INC parameter to further optimize the PN offset planning. This is appropriate when investigating the effect of different planning assignments and the scalability of the present PN offset planning for the future.

7) The ability to use preassigned PN offsets is included. This permits graceful PN offset planning for future growth sites without requiring a retune of the entire network. The preassigned PN offset indices are used in conjunction with the PILOT_INC parameter and the pilot interference power values to determine the offsets for the remaining CDMA sectors in the plan.

8) The ability to use a lower PILOT_INC value for PN offset planning with pre-assignments is included. To optimize PN offset planning for new unassigned CDMA sectors, a lower PILOT_INC value can be used so long as it is a divisor of the PILOT_INC value used in the pre-assignments.

9) Traffic distribution of users is included in the analysis. The PN offset planning systems and methods consistent with the principles of the present invention take into consideration the user defined traffic map such that if a potential geographical area is defined as having no traffic then it can be assumed that there is a low probability that an interfering mobile unit exists at this location. This reduces the amount of interference caused by the serving sector to other sectors in the plan.

The systems and methods consistent with the principles of the present invention provide optimum PN offset assignments while maximizing the amount of co-offset and adjacent offset protection possible in the network.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A computer-implemented method for assigning PN offsets in a network having a plurality of sectors, comprising:
   setting conditions for the network;
   setting a co-offset protection value for the network;
   assigning PN offsets to the sectors based on the network conditions and the co-offset protection value; and
   selectively adjusting the co-offset protection value to obtain optimum PN offset assignments.

2. The method of claim 1, wherein the setting conditions includes:
   setting parameters for the network.

3. The method of claim 2, wherein the setting parameters includes:
   designating power settings for communication channels, antenna gain, and handoff thresholds.

4. The method of claim 1, wherein the setting conditions includes:
   identifying each of the sectors in the network as one of a regular, border, and beacon sector, and
   setting power thresholds for each of the sectors based on whether the identified sector is a regular, border, or beacon sector.

5. The method of claim 4, wherein the setting power thresholds includes:
   setting the power thresholds for the identified border and beacon sectors at a higher level than other areas of the network.

6. The method of claim 1, wherein the setting conditions includes:
   determining potential interference between each of the sectors and mobile units in the network.

7. The method of claim 6, wherein the setting conditions further includes:
   identifying constraints for each of the sectors based on the potential interference.

8. The method of claim 7, wherein the identifying constraints includes:
   determining co-site, interference, neighbor, and neighbor of neighbor constraints for each pair of the sectors.

9. The method of claim 1, wherein the setting conditions includes:
   defining a traffic map for the network, and identifying geographical areas in the network with low or minimal traffic according to the defined traffic map.

10. The method of claim 1, wherein the setting a co-offset protection value includes:
    approximating a highest co-offset protection value for successful PN offset assignments based on the network conditions.

11. The method of claim 1, wherein the setting a co-offset protection value includes:
    setting an initial co-offset protection value based on the network conditions; and
    wherein the assigning PN offsets includes:
        selecting an unassigned one of the sectors with a high measure of PN offset assignment difficulty based on the initial co-offset protection value, and
        assigning a PN offset to the selected sector to minimize a cost of assignment on the network.

12. The method of claim 11, wherein the selectively adjusting includes:
    determining whether the PN offset assignments were successful, reducing the initial co-offset protection value if the PN offset assignments were unsuccessful, and
    increasing the initial co-offset protection value if the PN offset assignments were successful.

13. The method of claim 1, wherein the selectively adjusting includes:
    reassigning PN offsets to the sectors based on the adjusted co-offset protection value to obtain the optimum PN offset assignments.

14. A system for assigning PN offsets in a network having a plurality of sectors, comprising:
    means for setting conditions for the network;
    means for setting a co-offset protection value for the network;
    means for assigning PN offsets to the sectors based on the network conditions and the co-offset protection value; and
    means for selectively adjusting the co-offset protection value to obtain optimum PN offset assignments.

15. A system that assigns PN offsets in a network having a plurality of sectors, comprising:
    a memory that stores instructions; and
    a processor configured to execute the instructions to set conditions for the network, set a co-offset protection value for the network, assign PN offsets to the sectors based on the network conditions and the co-offset protection value, and selectively adjust the co-offset protection value to obtain optimum PN offset assignments.

16. The system of claim 15, wherein when setting conditions, the processor is configured to set parameters for the network.

17. The system of claim 16, wherein when setting parameters, the processor is configured to designate power settings for communication channels, antenna gain, and handoff thresholds.

18. The system of claim 15, wherein when setting conditions, the processor is configured to identify each of the sectors in the network as one of a regular, border, and beacon sector, and set power thresholds for each of the sectors based on whether the identified sector is a regular, border, or beacon sector.

19. The system of claim 18, wherein when setting power thresholds, the processor is configured to set the power thresholds for the identified border and beacon sectors at a higher level than other areas of the network.

20. The system of claim 15, wherein when setting conditions, the processor is configured to determine potential interference between each of the sectors and mobile units in the network.

21. The system of claim 20, wherein when setting conditions, the processor is further configured to identify constraints for each of the sectors based on the potential interference.

22. The system of claim 21, wherein when identifying constraints, the processor is configured to determine co-site, interference, neighbor, and neighbor of neighbor constraints for each pair of the sectors.

23. The system of claim 15, wherein when setting conditions, the processor is configured to define a traffic map for the network, and identify geographical areas in the network with low or minimal traffic according to the defined traffic map.

24. The system of claim 15, wherein when setting a co-offset protection value, the processor is configured to approximate a highest co-offset protection value for successful PN offset assignments based on the network conditions.

25. The system of claim 15, wherein when setting a co-offset protection value, the processor is configured to set an initial co-offset protection value based on the network conditions; and when assigning PN offsets, the processor is configured to select an unassigned one of the sectors with a high measure of PN offset assignment difficulty based on the initial co-offset protection value, and assign a PN offset to the selected sector to minimize a cost of assignment on the network.

26. The system of claim 25, wherein when selectively adjusting, the processor is configured to determine whether the PN offset assignments were successful, reduce the initial co-offset protection value if the PN offset assignments were unsuccessful, and increase the initial co-offset protection value if the PN offset assignments were successful.

27. The system of claim 15, wherein when selectively adjusting, the processor is configured to reassign PN offsets to the sectors based on the adjusted co-offset protection value to obtain the optimum PN offset assignments.

28. A computer program product for assigning PN offsets in a network having a plurality of sectors, comprising:
an interference analysis module configured to set conditions for the network;
a coarse optimization module configured to set a co-offset protection value for the network;
a PN assignment module configured to assign PN offsets to the sectors based on the network conditions and the co-offset protection value; and
a fine optimization module configured to selectively adjust the co-offset protection value to obtain optimum PN offset assignments.

29. The computer program product of claim 28, wherein when setting conditions, the interference analysis module is configured to set parameters for the network.

30. The computer program product of claim 29, wherein when setting parameters, the interference analysis module is configured to designate power settings for communication channels, antenna gain, and handoff thresholds.

31. The computer program product of claim 28, wherein when setting conditions, the interference analysis module is configured to identify each of the sectors in the network as one of a regular, border, and beacon sector, and set power thresholds for each of the sectors based on whether the identified sector is a regular, border, or beacon sector.

32. The computer program product of claim 31, wherein when setting power thresholds, the interference analysis module is configured to set the power thresholds for the identified border and beacon sectors at a higher level than other areas of the network.

33. The computer program product of claim 28, wherein when setting conditions, the interference analysis module is configured to determine potential interference between each of the sectors and mobile units in the network.

34. The computer program product of claim 33, wherein when setting conditions, the interference analysis module is further configured to identify constraints for each of the sectors based on the potential interference.

35. The computer program product of claim 34, wherein when identifying constraints, the interference analysis module is configured to determine co-site, interference, neighbor, and neighbor of neighbor constraints for each pair of the sectors.

36. The computer program product of claim 28, wherein when setting conditions, the interference analysis module is configured to define a traffic map for the network, and identify geographical areas in the network with low or minimal traffic according to the defined traffic map.

37. The computer program product of claim 28, wherein when setting a co-offset protection value, the coarse optimization module is configured to approximate a highest co-offset protection value for successful PN offset assignments based on the network conditions.

38. The computer program product of claim 28, wherein when setting a co-offset protection value, the coarse optimization module is configured to set an initial co-offset protection value based on the network conditions; and when assigning PN offsets, the PN assignment module is configured to select an unassigned one of the sectors with a high measure of PN offset assignment difficulty based on the initial co-offset protection value, and assign a PN offset to the selected sector to minimize a cost of assignment on the network.

39. The computer program product of claim 38, wherein when selectively adjusting, the fine optimization module is configured to determine whether the PN offset assignments were successful, reduce the initial co-offset protection value if the PN offset assignments were unsuccessful, and increase the initial co-offset protection value if the PN offset assignments were successful.

40. The computer program product of claim 28, wherein when selectively adjusting, the fine optimization module is configured to reassign PN offsets to the sectors based on the adjusted co-offset protection value to obtain the optimum PN offset assignments.

41. A method for assigning PN offsets in a network having a plurality of sectors and a plurality of mobile units, comprising:

- determining interference values between each of the sectors and mobile units in the network;
- identifying constraints for each of the sectors based on the interference values;
- approximating a co-offset protection value for successful PN offset assignments based on the determined interference values and the identified constraints; and
- selectively adjusting the co-offset protection value to obtain optimum PN offset assignments.

* * * * *